(12) United States Patent
Wilde et al.

(10) Patent No.: US 7,580,895 B2
(45) Date of Patent: Aug. 25, 2009

(54) PRODUCT PROTECTION GATEWAY AND METHOD FOR CHECKING THE AUTHENTICITY OF PRODUCTS

(75) Inventors: Ralf Wilde, Tokyo (JP); Sebastian Doose, Yokohama (JP); Kurt Heinz, Tokyo (JP)

(73) Assignee: TUEV Rheinland Holding AG, Cologne (DE)

( * ) Notice: Subject to any disclaimer, the term of this patent is extended or adjusted under 35 U.S.C. 154(b) by 0 days.

(21) Appl. No.: 11/311,146

(22) Filed: Dec. 20, 2005

(65) Prior Publication Data

US 2006/0100964 A1    May 11, 2006

Related U.S. Application Data

(63) Continuation of application No. PCT/EP2004/005581, filed on May 25, 2004.

(30) Foreign Application Priority Data

Jun. 25, 2003   (DE) ................. 103 28 328

(51) Int. Cl.
*G06Q 99/00* (2006.01)
(52) U.S. Cl. .............. 705/62; 705/400; 705/401; 705/60; 705/26; 705/61
(58) Field of Classification Search ............ 705/410, 705/50–79, 26, 1, 400–401
See application file for complete search history.

(56) References Cited

U.S. PATENT DOCUMENTS

| | | | |
|---|---|---|---|
| 4,816,824 A | 3/1989 | Katz et al. | |
| 5,367,148 A | 11/1994 | Storch et al. | |
| 6,005,945 A * | 12/1999 | Whitehouse | 380/51 |
| 6,226,619 B1 | 5/2001 | Halperin et al. | |

(Continued)

FOREIGN PATENT DOCUMENTS

DE    28 26 469 C2    12/1982

(Continued)

OTHER PUBLICATIONS

Menezes et al., "Handbook of Applied Cryptography", 1997, CRC Press, p. 33,285-2876, 452-453.*

(Continued)

*Primary Examiner*—Jalatee Worjloh
(74) *Attorney, Agent, or Firm*—Venable LLP; Robert Kinberg

(57) ABSTRACT

The invention relates to a product protection system whereby a product piece is provided with a product-specific identification sequence (K) which is converted into a coded check sequence (C), by means of an encoding method (F1) using a secret encoding sequence (B). A product control sequence is applied to or on the product piece which comprises the coded check sequence (C), or a sequence derived therefrom. In order to check the authenticity of the product piece, the product control sequence is recorded by a control requester and transmitted by internet to a product protection server structure. A decoded check sequence is derived therein from the product control sequence by means of a decoding method using a decoding sequence. The authenticity of the decoded check sequence, or a sequence derived therefrom is checked and the result of the authenticity check transmitted by internet to the control requester.

47 Claims, 3 Drawing Sheets

U.S. PATENT DOCUMENTS

| | | |
|---|---|---|
| 6,681,214 B1 * | 1/2004 | Doljack .................. 705/75 |
| 6,889,214 B1 * | 5/2005 | Pagel et al. ............ 705/410 |
| 6,996,543 B1 * | 2/2006 | Coppersmith et al. ....... 705/50 |
| 7,225,166 B2 * | 5/2007 | Brookner et al. ............ 705/62 |
| 2003/0177095 A1 * | 9/2003 | Zorab et al. ................ 705/50 |
| 2004/0059680 A1 * | 3/2004 | Lang et al. ................. 705/60 |
| 2004/0128254 A1 * | 7/2004 | Pintsov .................... 705/62 |

FOREIGN PATENT DOCUMENTS

| | | |
|---|---|---|
| DE | 4109114 | 9/1992 |
| DE | 4341880 | 6/1995 |
| DE | 198 38 913 A1 | 10/1999 |
| DE | 199 20 744 A1 | 11/2000 |
| DE | 19920744 | 11/2000 |
| DE | 101 24 442 A1 | 11/2002 |
| DE | 10137695 | 2/2003 |
| SI | 9800026 | 8/1999 |
| WO | WO 00/23954 | 4/2000 |

OTHER PUBLICATIONS

Cai, Yiwang et al., "Digital Anti-Counterfeiting Scheme Based on Symmetric Keys" (English Translation).*

German Patent and Trademark Office Action, dated Mar. 19, 2004, issued in connection with German counterpart Application No. 103 28 328.5-53 (w/English translation).

First Office Action issued by the State Intellectual Property Office, P.R., China on Sep. 5, 2008, in connection with Chinese counterpart Application No. 200480017958.6 (w/English translation).

Caiy et al., "Digital anti-counterfeiting scheme based on symmetric keys," *J. Tsinghua Univ.* (*Sci. & Tech.*), vol. 3, No. 1, pp. 90-93 (2003) (with English translation of the Abstract).

* cited by examiner

ENCODING       DECODING

ENCODING       DECODING

ENCODING       DECODING

PRODUCT PROTECTION GATEWAY AND METHOD FOR CHECKING THE AUTHENTICITY OF PRODUCTS

CROSS-REFERENCE TO RELATED APPLICATION

This is a continuation of International Patent Application No. PCT/EP2004/005581 filed May 25, 2004, designating the United States and claiming priority of German Patent Application No. 103 2 328.5 filed Jun. 25, 2003, the disclosure of all of the foregoing applications being incorporated herein by reference.

BACKGROUND OF THE INVENTION

The invention relates to a system for protecting products against imitation as well as to check the authenticity of products and/or to detect product imitations.

Very few products are protected against imitations. Increasingly better technical options and involved methods used by the imitators result in ever better imitations. Consumers and dealers can rarely distinguish at first glance between the original product and the imitated product. The result is a drop in turnover, liability claims, and loss of image for the producers of proprietary goods. The conventional identification features of many brand names, for example labels and packaging, no longer present obstacles for imitators. In addition to the product itself, its complete presentation is imitated these days.

Attempts have been made to counter these imitations with the aid of special protective features, which require a high technical and financial expenditure and for the most part can be produced only by businesses specializing in this type of work. The product, or its packaging, or the accompanying documents are provided at the production stage already with protective features such as safeguarding threads, planchets, and the like, which are provided with one or several substances having a physical or chemical property that can be checked visually or with a machine, e.g. fluorescence or magnetism. Hologram labels having a color effect which depends on the viewing angle and cannot be reproduced by copiers, represent a favorite protection feature that is affixed to the product or its packaging. The known measures for increasing the protection against imitation and increasing the rate of detection of imitations furthermore include the use of microtext, guilloche print, kinegrams, transponders, and the like.

However, the protective features used in each case make sense only for a restricted number of products, for example depending on legal, medical, or even economic requirements. Technologically involved measures may also require sensors and measuring devices, which are not readily available, for checking the imitations. Conversely, the simpler and cheaper the production of the protective feature, the smaller the technical advantage, upon which the protective feature is based, as compared to the imitator.

The so-called unique-card-method is known from German Unexamined Published Application DE-OS 27 34 456. With this method, an open information such as an account number and/or a personalizing information is combined with a unique number to form an encoded information, wherein this information is then input into a recording medium. During the reading and checking of the recording medium, the open information is initially derived again from the coded information and the unique number. This open information is then compared to the open information recorded on the recording medium. This method is used to protect ID cards and documents.

German Unexamined Published Application DE 28 26 469 C2 discloses a method and a device for protecting documents, for which an identification number is encoded and recorded on the document. During the check, the coded identification number read out of the document is decoded and is compared to the original identification number.

It is the object of the present invention to propose a general product protection method which can in principle be used for all types of products, has the lowest possible requirements with regard to checking, and is cost-effective.

This object is solved according to the invention with a method for producing a product protection identification as defined in claim 1, with a product piece that cannot be imitated as defined in claim 12, and with a method for checking the authenticity of a product piece as defined in claim 23, as well as with a product protection server structure as defined in claim 37. Advantageous modifications of the invention follow from the dependent claims. Computer program products for implementing the method according to the invention follow from claims 44, 45.

With the method according to the invention, a product-specific identification sequence is initially determined for each product piece in order to generate a product protection identification which is affixed to or on the product piece, thus ensuring the authenticity of a product piece. The product-specific identification sequence or a sequence derived from it is encoded with the aid of an encoding method (F1), using a secret encoding sequence (B), wherein a coded check sequence is generated. A product control sequence comprising the coded check sequence or a sequence derived from it is affixed on or to the product piece.

In order to distinguish original products from imitations, a secret encoding sequence (B) as well as an encoding method (F1) is made available to the producer of a product, which enables the producer to convert the respective product-specific identification sequence into a coded check sequence which is then affixed to or on the product piece. Instead of ensuring the authenticity of a product piece with the aid of physical, measuring-technical, or chemical product features, the method according to the invention identifies imitations with the aid of the cryptographically generated product control sequence. A protective feature can thus be made available, which can be used for all product groups because it is not dependent on physical or chemical product characteristics. No sensors or measuring devices are required for testing the authenticity of a product, but only a check of the authenticity of the product control sequence. Since only an encoding method is used in place of complicated protective features (for example microtext, guilloche print, kinegrams, transponders, etc.), the method according to the invention is also much more cost-effective than the protective features employed so far.

It is advantageous if the coded check sequence (C) cannot be generated from the product-specific identification sequence (K) without knowledge of the secret encoding sequence (B). Only producers who possess the secret encoding sequence can generate product control sequences for the product pieces they produce. The secret encoding sequence (B) cannot be derived from the product control sequences of products that are commercially available.

According to a different advantageous embodiment of the invention, the product control sequence comprises the product-specific identification sequence (K) in addition to the encoded check sequence (C) or the sequence derived from it.

With this embodiment of the invention, the product control sequence contains the non-encoded identification sequence (K) as well as the coded check sequence (C). Thus, the authenticity of the product control sequence can be tested by checking whether the two segments of the product control sequence match, for example by realizing a decoding of the coded check sequence (C) or an encoding of the product-specific identification sequence (K).

It is furthermore advantageous if the serial number for the product piece is used for the product-specific identification sequence (K). The serial number is generated during the production and permits allocating a product piece to a specific batch. In particular when producing higher-quality products, it is standard practice to affix a serial number. The serial number can be supplemented easily by adding the encoded check sequence in order to generate the product control sequence according to the invention.

According to a different and advantageous embodiment of the invention, the secret encoding sequence (B) is the secret code for a symmetric encoding method. Symmetric encoding methods are also referred to as single-key systems or secret key systems. A secret code, meaning a secret encoding bit sequence, is used to encode a product-specific identification sequence or a sequence derived from it. With symmetric encoding methods, the encoded sequence generated in this way can only be decoded with knowledge of this secret code, even if the encoding and decoding methods are generally known. Conversely, if the decoding of an encoded sequence with a secret code provides the underlying non-encoded sequence, this sequence can have been encoded only with knowledge of this secret code.

Symmetric methods can generally be realized very quickly and with little expenditure, using hardware or software. Using symmetric encoding methods furthermore has the advantage that the generally used code lengths and block lengths are relatively short. As a result, the generated check sequences and the product control sequences are also relatively short and can be affixed easily to the product pieces.

In particular, it is advantageous if the symmetric encoding method is selected from among the following encoding methods: Triple-DES, IDEA, CAST-128, Blowfish, RC5, f8, Rijndael.

Alternatively, it is an advantage if the secret encoding sequence (B) is the secret code for an asymmetric encoding method. Asymmetric encoding methods, which are also called two-key or public-key methods, use code pairs formed with a public code and a private code. Since the private code cannot be computed from the public code with the computer capacity available at the present time, the public code can be made public. With the product protection method according to the invention, it offers itself to use the secret code on the side of the producer for encoding the identification sequence or a sequence derived from it. The public code, which can be made freely available to all communication participants without secrecy requirements, can thus be used for testing the product authenticity. In particular, this allows a decentralized testing which can be carried out by the participating dealers and consumers at many different locations. All dealers can be provided with the public code required for the decoding operation.

It is particularly advantageous in that case if the asymmetric encoding method is selected from among the following encoding methods: RSA, ElGamal, DSA, ECC.

It is also advantageous if the product-specific identification sequence (K) is converted with a first hash method ($h_1$) into a first hash sequence ($h_1(K)$), prior to the encoding, wherein the encoded check sequence (C) is generated by encoding the first hash sequence ($_1(K)$) with the secret encoding sequence (B). Thus, a hash method ($h_1$) is initially applied to the product-specific identification sequence and the resulting hash sequence is then encoded. The protection for the encoding that is realized can be increased on the whole by using a hash method in addition to the encoding operation. It is therefore nearly impossible for an imitator to determine the underlying encoding method (F1) as well as the underlying secret encoding sequence (B) by using the encoded check sequence (C).

It is furthermore advantageous if, following the encoding, the encoded check sequence (C) is converted with the aid of a second hash method ($h_2$) to a second hash sequence ($h_2(C)$), which is then affixed on or to the product piece as component of the product control sequence. With the aid of a second hash method ($h_2$), applied after the encoding operation, it is possible to shorten extremely long encoded check sequences (C) before they are affixed to or on the product piece as part of the product control sequence. In particular when using asymmetric encoding methods, which are characterized by long code lengths and block lengths, long encoded check sequences are created, which make it appear useful to apply a second hash method, wherein the second hash method on the whole increases the protection of the coding.

Selecting the first and second hash methods from among the following: MD 5, SHA-1, RIPE-MD 160, MDC-2 is particularly advantageous.

The imitation-proof product piece according to the invention comprises a product control sequence affixed to or on the product piece, which includes an encoded check sequence (C) or a sequence derived from it. The encoded check sequence (C) is generated specifically for the product piece by encoding a product-specific identification sequence (K) or a sequence derived from it with the aid of an encoding method (F1) and using a secret encoding sequence (B). In place of using the most expensive and hard to produce protective features possible, the protection against imitation for the product piece according to the invention is ensured by using an encoding method (F1) and the use of a secret encoding sequence (B). Generating and affixing the product control sequence to the product piece to be protected causes little expenditure and is cost-effective.

According to one advantageous embodiment of the invention, the product control sequence is affixed to the product piece in the form of an alpha-numerical character string. For example, the coded check sequence and the product control sequence can be generated in the form of bit sequences, wherein the product control sequence can be reproduced as a number sequence, with numbers ranging from 0 to 9, or as a sequence of ASCII characters, or as an optional alpha-numerical character string, and can be affixed to the product piece.

It is furthermore advantageous if the product control sequence is affixed to the product piece in a machine-readable form. For example, the product control sequence could be affixed to the product piece in the form of a universal unit code (barcode) or as machine-readable text. The product control sequence could also be stored on a magnetic strip, a storage chip, or any other electronic medium that is connected with the product, the product packaging, or the accompanying documents. With this type of embodiment of the invention, longer product control sequences can also be processed because no typing-in is required.

It is a further advantage if the product control sequence is affixed to the product piece as visually readable text. With this embodiment of the invention, the product control sequence can be checked by using a keyboard to type in the product control sequence.

According to a different advantageous embodiment of the invention, the product control sequence is affixed to a document enclosed with the product piece or to the packaging. In this way, a long product control sequence can be enclosed with the product without damaging the product appearance.

With the method according to the invention for checking the authenticity of a product piece, the authenticity of the product piece is checked via the Internet and a product control sequence that is affixed to or on the product piece. The product control sequence is detected in that case by the person submitting the control request and is transmitted via the Internet to a product protection server structure. On the side of the product protection server structure, a coded check sequence (C) that is derived from the product control sequence is decoded by means of a decoding method (F2) and a decoding sequence (A), thereby generating a decoded check sequence. The decoding sequence (A) in this case forms a complementary code pair together with the encoding sequence (B), used for the encoding. The authenticity of the decoded check sequence or a sequence derived from it is checked and the result of the authenticity check is then transmitted via the Internet to the person who submitted the control request.

A dealer wanting to check the authenticity of product pieces can, for example, transmit the corresponding product control sequences via his/her Internet browser to the product protection server structure. There, the decoding of the encoded check sequence (C) and the authenticity check are carried out, with the advantage that no local devices are needed on the side of the dealer for checking the product authenticity. Sensors and measuring devices, such as provided according to prior art for checking physical or chemical protective features, are not needed with the method according to the invention. The total investment for implementing the product protection system according to the invention is therefore minimal. Since the decoding is not realized locally, but centrally on the side of the product protection server structure, a secret or a public code can optionally be used as decoding sequence (A).

According to one advantageous embodiment of the invention, the decoding sequence (A) is the secret code for a symmetric encoding method. The use of a symmetric encoding method has the advantage of a relatively short code length as well as block length. Since the decoding of all control requests is realized centrally by the product protection server structure, keeping the decoding sequence (A) secret can be ensured with appropriate measures, for example by using firewalls, separate crypto servers, and the like. A further advantage of using a symmetric method is that the time required for each decoding operation is very short.

Alternatively, the public code for an asymmetric encoding method is advantageously used for the decoding sequence (A). When using an asymmetric encoding method, no special arrangements are required to keep the public code, used for the decoding, a secret. With asymmetric encoding methods, the secret encoding sequence (B) cannot be derived either from the decoding method (F2), or the decoding sequence (A), or from various random samples of pairs of non-encoded and encoded information bits. Even if an imitator were to obtain access to the public code, the decoding method, as well as various valid product control sequences, the imitator could not derive the secrete encoding sequence (B) from this. The imitator himself/herself therefore cannot generate valid product control sequences.

It is furthermore advantageous if the encoded check sequence (C) forms a sequence segment of the product control sequence or can be derived from a sequence segment of the product control sequence by applying a hash reversing function ($h_2^{-1}$). If, during the generating of the product control sequence, the encoded check sequence (C) was additional converted by means of a second hash method ($h_2$) to a second hash sequence ($h_2(C)$), then a hash reversing function ($h_2^{-1}$) must first be applied on the side of the product protection server structure to the respective segment of the product control sequence to obtain the coded check sequence (C). The coded check sequence (C) is subsequently decoded.

It is furthermore advantageous if the decoded check sequence represents a product-specific identification sequence (K) or can be converted to a product-specific identification sequence (K) by applying a hash reversing function ($h_1^{-1}$). If, during the generating of the product control sequence, the product-specific identification sequence (K) was converted to a first hash sequence ($h_1(K)$), prior to the decoding and by means of a first hash method ($h_1$), then a hash reversing function ($h_1^{-1}$) must be applied after the decoding to the decoded check sequence, on the side of the product protection server structure, in order to obtain the individual identification sequence (K).

According to a different advantageous embodiment of the invention, the authenticity of the decoded check sequence or a sequence derived from it is checked by comparing the decoded check sequence or the sequence derived from it with a product-specific identification code (K), forming a segment of the product control sequence, or a hash sequence ($h_1(K)$) derived from it. With this embodiment of the invention, the product control sequence comprises all information required for detecting the authenticity. The authenticity of the product control sequence can therefore be determined solely on the basis of the product control sequence itself, without requiring external information.

Alternatively, it is an advantage if the authenticity of the decoded check sequence or a sequence derived from it is checked by checking whether the decoded check sequence or the sequence derived from it matches previously determined allotments. With this embodiment of the invention, all producers are provided with sequence allotments ahead of time. To check the authenticity of a decoded check sequence or a sequence derived from it, it is determined whether or not this sequence matches an allotment assigned to one of the producers. The advantage of this step is that for this embodiment of the invention, the product control sequence does not have to comprise the non-encoded information. The product control sequence only needs to comprise the encoded information. For that reason, relatively short product control sequences are sufficient for this embodiment of the invention.

It is advantageous if the legitimacy of the person submitting the control request is checked within the framework of checking a product control sequence. Only authorized dealers are permitted to inquire about product control sequences. In addition, the path of the checked product pieces can be followed by requesting the legitimacy of the person submitting the request.

According to another advantageous embodiment of the invention, a database entry is made into a login database within the framework of a request for a product control sequence, thus making it possible to put together a login database which comprises database entries for all previously checked product control sequences. Assuming an imitator obtains a series of product control sequences for original products and affixes these product control sequences to the imitated goods, this cryptographic method would show that the respective product control sequence is authentic. However we now have several product pieces with identical product control sequences on the market. A multiple use of product control sequences of this type can be uncovered with the aid of the login database.

It is advantageous if a login database is requested to determine whether earlier requests were submitted concerning the product control sequence of the product piece. Assuming a first dealer submits a control request for the first product pieces received and checks the product control sequences affixed to the product pieces. The cryptographic method supplies the result that the product control sequences are authentic and, in addition, enters the data for these product control sequences in the login database. If a second dealer submits control requests at a later time for second product pieces that are provided with the identical product control sequences, it can be determined with the aid of the login database that another dealer previously submitted control requests for these product control sequences. Two options are then available: the product of the first dealer was the original product, and the second dealer had the imitation, or vice versa. If a multiple use is detected, the product available to the dealer submitting the request can either be an imitation or it may have served as modal for the imitation.

An effective protection can be achieved on the whole by combining the use of a cryptographic method with the establishment of a log for the various requests submitted by the various dealers.

It advantageous to compare at least one of the following: product control sequence, product-specific identification sequence (K), encoded check sequence (C), decoded check sequence, or a sequence derived from it to database entries in the login database. In the process, the product piece is identified as either an imitation or a model for an imitation if at least one match is detected. A specific product piece can be identified with any of the aforementioned sequences because each of these sequences is specific to the respective product piece. If a multiple use is detected for the respectively used sequence, it indicates the presence of either an imitation or an original product which served as model for an imitation.

It is advantageous if a database entry for a control request also contains the date on which the control request was submitted. In addition, it is advantageous if a database entry contains the identity of the person submitting the control request. Upon detecting a multiple use of a product-specific sequence, the path taken by the imitation products can be traced back, using the information entered for the participating dealers and the points in time at which the dealers submitted the control requests.

The product protection server structure according to the invention makes it possible to implement a product production gateway for checking the authenticity of product pieces with the aid of a product control sequence affixed to or on the product piece. The product protection server structure comprises a web server module, which makes available websites of the product protection gateway via the Internet. A product control sequence is transmitted via the Internet to the web server module and the result of the authenticity check is transmitted via the Internet to the person submitting the control request. The product protection server structure further comprises a cryptographic module for decoding an encoded check sequence (C), derived from the product control sequence, by means of a decoding method (F2) and using a decoding sequence (A), thus generating a decoded check sequence. A complementary code pair is thus formed with the decoding sequence (A) and the encoding sequence (B), used for the encoding. The authenticity of the decoded check sequence or a sequence derived from it is checked with the cryptographic module.

It is advantageous if the product protection server structure comprises a login database, which contains a database entry at least for each product control sequence for which the authenticity was determined. With the aid of such a login database, it is possible to prove the repeated use of product control sequences, an indication that a product imitation is present.

The method used to generate a product-protection identification can be realized with a computer program product, provided with means for implementing the corresponding method steps on a computer, a signal processor, or the like. The method for checking the authenticity of a product piece can also be realized with the aid of a computer program product, which is provided with means for realizing corresponding method steps on a computer, a digital signal processor, or the like.

BRIEF DESCRIPTION OF THE DRAWINGS

The invention is described further in the following with the aid of several exemplary embodiments shown in the drawing, which show in.

DETAILED DESCRIPTION OF THE INVENTION

Figure 1:
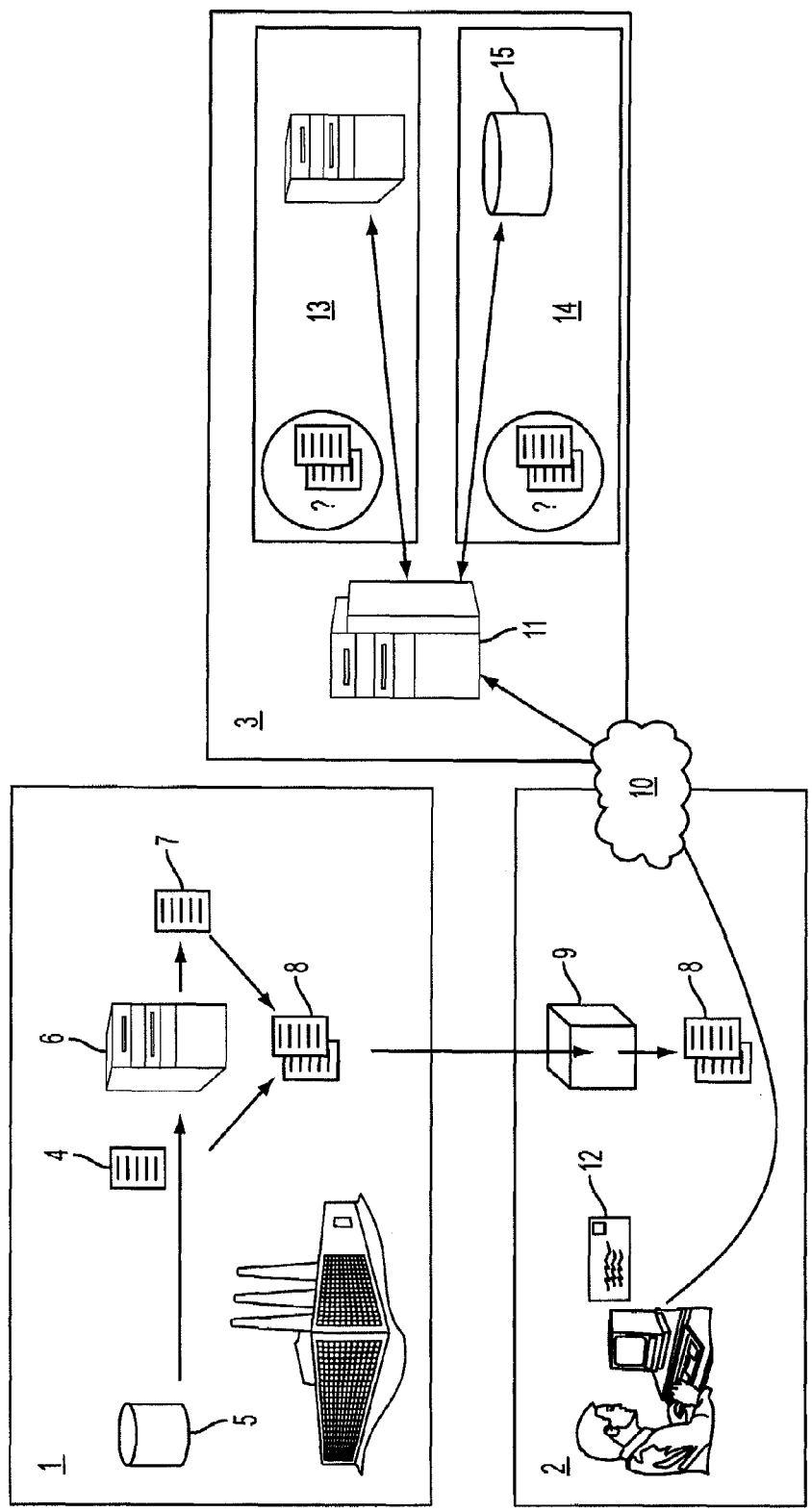
FIG. 1 A representation of the product protection system according to the invention.

FIG. 1 shows an overview over the product protection system according to the invention. The product protection system involves a producer 1 of the products, a dealer 2, as well as the provider of the product protection gateway 3. On the side of the producer 1, there is interest in permitting the buyers to check the product authenticity, so that the producer is protected against product imitations. For that purpose, the producer 1 assigns a specific identification sequence to each of the products that are produced by the producer. Any optional bit sequence, number sequence, or alphanumeric character string can be used as identification sequence. Using the serial number for the respective product as product-specific identification sequence consequently offers itself because this serial number is available as part of the production data 5.

Following this, an encoded check sequence 7 must first be generated on the side of the computer structure 6 for the producer, starting with the product-specific identification sequence 4 and using a secret encoding method. This encoded check sequence 7 can again be represented as bit sequence, test number, or alphanumeric character string. All encoding methods which use a secret encoding sequence can be used for encoding the identification sequence 4. Otherwise, optional product control sequences could be imitated by an imitator able to obtain the encoding sequence. Symmetric encoding methods can be used for the encoding, wherein these are also called single-key systems and/or secret-key systems. A secret code is used with these methods for encoding as well as decoding. A sequence encoded with a secrete code can only be decoded again with the aid of this secrete code, even if the encoding and decoding methods are generally known.

Asymmetric encoding methods can be used as alternative to the symmetric encoding methods for encoding the product-specific identification sequence. The asymmetric encoding methods are also called two-key methods and/or public-key methods. Methods of this type utilize code pairs, which comprise respectively a secret code and an associated public code. With public key systems that correspond to present-day safety standards, the private code cannot be computed from the public code, given the presently available computer capacity. For that reason, the public code can be made freely accessible. Whereas the private code, which must be kept a secret, is known only to the owner and can be used exclusively by the owner, the public code of a user is freely accessible to all communication participants.

When using an asymmetric encoding method, the private code of the producer 1 is used to encode the product-specific identification sequence 4. This code is available only on the computer system 6 of the producer 1 and must not be made public.

The associated public code of the code pair, which can be transmitted to all dealers and consumers without special safety precautions, is used to decode the check sequence 7 encoded in this way. In particular, this public code can also be made available via the Internet.

A product-specific identification sequence 4 as well as a coded check sequence 7 is then available for each product piece. To ensure the product authenticity, both sequences can be affixed jointly to the product, as product control sequence 8. The product control sequence 8 affixed on or to the product piece can take the form of a bit sequence, a number sequence, or an alphanumerical character string. For example, the product control sequence could be a number sequence containing a non-decoded serial number as the first component and an encoded test number as the second component. However, it is not absolutely necessary for the product control sequence 8 to comprise the identification sequence 4 as well as the encoded check sequence 7. The product control sequence 8 could also consist solely of the encoded check sequence 7. In that case, the product-specific identification sequence 4 would be obtained only during the decoding of the product control sequence 8.

The product control sequence 8 can be affixed to the product in any optional form, for example by printing, embossing, stamping it on, or by printing it onto the packaging, and the like. The product control sequence 8 could also be printed onto a piece of paper enclosed with the packaging for the product. The product control sequence 8 can be affixed to the product in machine-readable or visually readable form. The machine-readable codes, for example, could be barcodes, but also magnetic strips or other magnetizable media for storing the product control sequence 8.

The product with the product control sequence 8 affixed to or on it is shipped via different distribution paths to a dealer 2 who wants to check the authenticity of the received product. The dealer 2 wants to be sure to have purchased the original product from the producer 1 and not a copy of the product, produced by an imitator. If the dealer 2 markets imitation products, the dealer risks not being able to market additional products once the imitation is discovered. The imitation products are frequently of poorer quality than the original products and, insofar, would also harm the reputation of the dealer 2.

To check the authenticity of a product 9 in the possession of the dealer, the dealer 2 accesses the server structure 11 of the product protection gateway 3 via the Internet 10. The dealer 2 must first provide identification to the product protection gateway by reporting the dealer identification 12, wherein a login ID and a password are generally used for legitimizing a user access. Once the dealer 2 has successfully proven his/her identity, the dealer is given access to the websites of the product protection gateway, which are transmitted by the server structure 11 via the Internet 10 to the browser of the dealer and are displayed there. The dealer can enter on one of the websites the product control sequence 8 for the good, at a specifically provided input window, whereupon the product control sequence 8 is transmitted via the Internet 10 to the server structure 11.

On the side of the server structure 11, the received product control sequence 8 is checked by means of a first check 13 and a second check 14. The product control sequence 8 contains the encoded check sequence 7. This encoded check sequence is decoded in the first check 13 by means of a decoding method and using a decoding sequence, wherein a decoded check sequence is generated in the process. The decoding method complements the encoding method used on the side of the producer 1.

When using a symmetric method, the decoding sequence used during the decoding operation must coincide with the encoding sequence used on the side of the producer 1. With symmetric methods, it is necessary to keep the encoding sequence as well as the decoding sequence a secret. Keeping the decoding sequence a secret can be ensured because the decoding operation is realized centrally in the server structure 11.

If an asymmetric method is used, for which the encoded check sequence is generated on the side of the producer 1 with the aid of a secret encoding sequence, the encoded check sequence can be decoded with a public decoding sequence, a so-called "public key." Thus, when using an asymmetric method, it is not necessary to keep the decoding sequence a secret on the receiver side. This could become important for further development stages of the project, for which the product is no longer checked by means of the central server structure, but with a plurality of decentralized testing devices. The decoding sequence could then be stored in the form of a public code in all testing devices.

In cases where the product control sequence comprises the (non-encoded) identification sequence as well as the encoded check sequence as components, the decoded check sequence is first compared to the non-encoded identification sequence. The checked product control sequence is consistent in itself if the decoded check sequence coincides with the product-specific identification sequence, used as the starting point for computing the encoded check sequence. In that case, the result obtained with the first check 13 shows that the product control sequence of the product piece checked by the dealer 2 is authentic. If the decoded check sequence does not coincide with the product-specific identification sequence, then the product control sequence is not authentic.

Thus, the product is an imitation if other sources of error can be ruled out. The check result is transmitted by the server structure 11 via the Internet 10 to the web browser for the dealer 2 and is displayed there.

The product control sequence of an alternative embodiment of the invention comprises as component of the product control sequence only the encoded check sequence, but not the product-specific identification sequence. In that case, the encoded check sequence is also initially decoded by means of the decoding method to generate a decoded check sequence.

The decoded check sequence obtained in this say can be checked if the test-sequence allotments to the individual producers are known on the side of the server structure 11, by determining whether the decoded check sequence is contained in one of these allotted sequences. Insofar, it is not absolutely necessary for the identification number to be a component of the product control sequence.

However, imitations are conceivable for which the imitator obtains one or several product control sequences of original products and affixes these to the imitated product pieces. The imitated product then has a correct product control sequence and can therefore not be identified as imitation by means of the first check 13. A second check 14 is provided to discover such product imitations, wherein the actually requested product control sequence is compared to all earlier requested product control sequences. If a product control sequence is copied and affixed to an imitation product, the respectively involved dealers can over time submit control requests for the original product as well as the imitation product. As a result, multiple requests can be submitted over time for one and the same product control sequence.

Multiple requests of this type are identified during the second check 14 with the aid of a login database 15. A corresponding database entry is stored in the login database 15 for each control request processed by the server structure 11. For identifying a control request, a database entry comprises at least one of the following sequences: the product control sequence, the product-specific identification sequence, the encoded check sequence, or the decoded check sequence. The database entry furthermore comprises the ID of the dealer submitting the control request, as well as the date and possibly also the time of day for the control request. Since this system is intended for world-wide use, the respective time zone where the requesting dealer resides must be entered in addition to recording the date and time of day. The date/time format must allow an international comparison of date and time for the various requests.

Following each dealer request, the login database 15 is searched during the second check 14, using the product control sequence input by the dealer. If an earlier request was submitted for the product control sequence entered by the dealer, it leaves two possibilities: the product piece could be an imitation, or it could be an original product, for which the product control sequence was used as model for producing an imitation product. Further steps for checking the good can then be introduced on the basis of the identifications, stored in the login database, for the involved dealers who submitted the various requests, well as the date and time entries.

Once a product control sequence has been verified in the first check 13 and no multiple use of the product control sequence was detected during the second check 14, the server structure 11 will notify the dealer via the Internet 10 that the product piece presumably is not an imitation. However, this can still not be determined with absolute certainty because it would be conceivable for an imitator to have used a product control sequence of an original product which has not yet been checked. In that case, the system would detect an imitation only once it receives a request for the product control sequence of the original.

Figure 2:
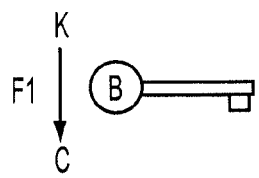
FIG. 2 A schematic representation of the encoding and decoding of a product-specific identification sequence K.
Figure 2:
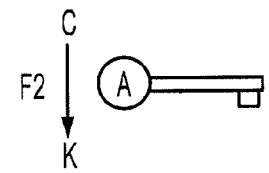

The encoding and decoding of the product-specific identification sequence K is shown schematically in FIG. 2. On the side of the producer, the product-specific identification sequence K is encoded with the aid of the encoding method F1 and using the code B, wherein a coded check sequence C is obtained.

The coded check sequence C is decoded again with the aid of the decoding method F2 and using the code A, wherein the product-specific identification sequence K is once more obtained. If the product control sequence comprises as component the product-specific identification sequence K in addition to the encoded check sequence C, then the identification sequence obtained through decoding can be compared to the identification sequence transmitted as component of the product control sequence. The product control sequence is authentic if these identification sequences coincide whereas the product control sequence could be an imitation if they do not coincide.

So-called symmetric methods can be used for the encoding and decoding, which are also called single-key systems or secret-key systems. With these methods, the encoding method F1 and the respective secret code B, used for the protection, coincide with the decoding method F2 and the corresponding secret code A, used for the control. With single-key methods of this type, the code B used by the producer for the protection, as well as the code A, used on the side of the product production gateway, must be kept secret.

For the encoding operation, the secret code B is used only on the side of the producers where the required measures for keeping the code a secret can be taken. For example, the product control sequences can be generated on computers which are not connected to the Internet. For the decoding, the secret code A is needed only centrally on the side of the server structure for the product protection gateway. The measures required for keeping the code A secret can also be taken on the side of the server structure. Insofar, it does not represent a major restriction if the code B as well as the code A must be kept secret. Symmetric encoding methods can generally be realized very quickly and cheaply either with hardware or software. A further advantage is that the encoded check sequences, generated by means of a symmetric encoding method, normally have relatively short lengths, meaning the product control sequences also consist only of relatively short sequences of alpha-numerical characters.

The secret code B used with symmetric encoding methods cannot be derived on the basis of various random samples of pairs of non-encoded and encoded information bits. A further critical feature of symmetric encoding methods is that the encoded information (C) cannot be generated from the non-encoded information (K) without the secret code B. A number of symmetric encoding methods exist, which are suitable for use with the product protection method according to the invention. One example is the method Triple DES, which successively uses the DES encoding method three times, wherein two or three different codes are used. DES provides for encoding plain text blocks with a length of 8 byte, using a 56 bit long code for cipher text blocks of 8 byte length. A different symmetric encoding method is the IDEA method, which is based on modulo-arithmetic and can be implemented easily with hardware and software. Alternatively, the symmetric encoding methods CAST-128, RC5, or f8 can also be used. The f8 method was primarily developed by ETSI within the framework of a $3^{rd}$ generation partnership project (3GPP). The f8 method is a flow cipher, wherein the length of the data block to be encoded can range from 1 to 20,000 bit. It is based on the KASUMI block cipher (block length 64 bit). KASUMI, in turn, is a derivative of the MISTY algorithm which was developed by Mitsubishi. A different symmetric encoding method is the Rijndael algorithm, which uses 8 boxes as non-linear components and can be implemented with hardware as well as software.

To avoid that a producer must realize all encodings with the aid of one and the same private code B, an additional code management can be provided when using a symmetric encoding method. For example, different secret codes can be used in a chronological sequence, such that the validity of each code is limited in time. Shell models additionally exist for the code management, for which different code components of the inner and outer shell can be used jointly for the encoding. For example, different validity periods can be specified for the code components of the inner and outer shells.

As an alternative to the symmetric encoding methods, asymmetric encoding methods can also be used for encoding and decoding the product-specific identification sequences. On the side of the producer, the identification sequence K is encoded by means of an encoding method F1 and using a code B. A secret code B must be used for the encoding since the use of a public code would allow anyone to generate an associated coded check sequence C for an identification sequence K. For the decoding, the encoded check sequence C is decoded by means of a decoding method F2 and using the code A. When using an asymmetric method, also referred to as two-key or public-key system, a public code that is freely accessible to anyone can be used for the decoding operation. With a public-key method, the secret code B and the public code A form a complementary code pair. The secret code B, used for the encoding with asymmetric methods, cannot be obtained either on the basis of the decoding method F2 used during the check, or the public code A used for the decoding, at least not with presently available computer capacities. The secret code B also cannot be derived from different random samples of pairs of non-encoded and encoded information bits. The secret code B thus is available only to the producer and cannot be derived from the publicly accessible information. Another important feature of asymmetric encoding methods is that the encoded information (C) cannot be obtained on the basis of the non-encoded information (K) without using the secret code (B).

The RSA method, for example, can be used as asymmetric encoding method. With the RSA method, the protection is based on the factorizing of large numbers, wherein the public and private codes depend on a pair of large prime numbers (p, q). Also suitable is the asymmetric encoding method ElGamal, for which the protection depends on the difficulty of computing discrete logarithms via a finite body. Alternatively, DSA can be used and is also based on the problem of a discrete logarithm. The asymmetric encoding method DSA uses several parameters, among others a prime number p, for which the bit length is synonymously called the code length, a 160 bit long prime factor of p−1, as well as the hash function SHA. The asymmetric ECC method (elliptic curve cryptography), which can also be used, is likewise based on the problem of computing the discrete logarithm.

Figure 3:
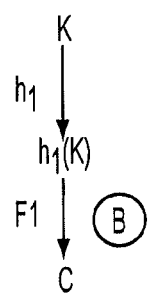
FIG. 3 A representation of the encoding and decoding of a product-specific identification sequence K, wherein a first hash function $h_1$ is applied to the identification sequence K prior to the encoding.
Figure 3:
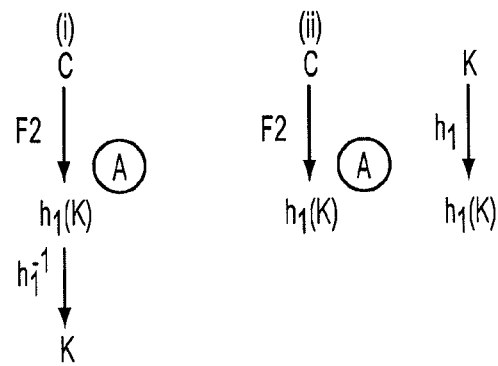

To increase the encoding protection and shorten long check sequences, so-called hash methods can be used in addition to the actual encoding method. FIG. 3 shows a hash method $h_1$ which is applied to the product-specific identification sequence K prior to the actual encoding operation, thereby generating the hashed identification sequence $h_1(K)$. This hashed identification sequence $h_1(K)$ is subsequently encoded by means of the encoding method F1 and using the code B in order to obtain the encoded check sequence C.

Two different options for decoding the encoded check sequence C are shown on the right side of FIG. 3. For the variant with reference (i), the encoded check sequence C is initially decoded by means of the decoding method F2 and using the code A, thereby generating the hashed identification sequence $h_1(K)$. In a second step, the reversing function $h_1^{-1}$ of the hash function $h_1$ is applied to the hashed identification sequence $h_1(K)$, so as to obtain the product-specific identification code K. This identification sequence, which is obtain through decoding, can then be compared to the identification sequence that is transmitted as component of the product control sequence.

For the decoding method variant with reference (ii), the encoded check sequence C is also initially decoded by means of the decoding method F2 and using the code A, wherein the hashed identification sequence $h_1(K)$ is obtained. In addition, the hash function $h_1$ is applied to the identification sequence K, transmitted as component of the product control sequence, thereby also generating the hashed identification sequence $h_1(K)$. The authenticity of the product control sequence can be checked by comparing the hashed identification sequences obtained by decoding C and applying $h_1$ to K. The encoding protection can be improved further by using a hash method prior to the encoding operation.

Figure 4:
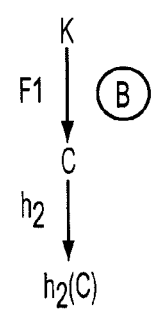
FIG. 4 A representation of the encoding and decoding of a product-specific identification sequence K, wherein a second hash function $h_2$ is applied to the encoded check sequence following the encoding.
Figure 4:
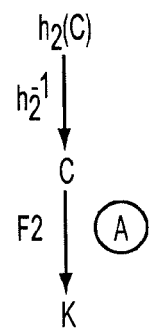

As an alternative or in addition, it is also possible to first realize the encoding and then apply the hash function to the encoded sequence, as shown in FIG. 4. The identification sequence K is first encoded by means of the encoding method F1 and using the code B, wherein the encoded check sequence C is obtained. Subsequently, the hash function $h_2$ is applied to the encoded check sequence C to obtain the hashed sequence $h_2(C)$. In order to decode this sequence, the reversing function $h_2^{-1}$ of the hash function $h_2$ must first be applied to the hashed sequence $h_1(C)$, so as to obtain the encoded check sequence C. The encoded check sequence C can then be converted to the identification sequence K by means of the decoding method F2 and using the code A. A hash method that is used following the encoding operation is particularly useful for shortening long check sequences. As a result, the product control sequence, which comprises the encoded check sequence, is also shortened correspondingly.

The hash method $h_1$ shown in FIG. 3, which is used prior to the encoding, can also be used together with a hash method $h_2$ that is used after the encoding. In that case, the reversing function $h_2^{-1}$ would first have to be applied during the decoding operation. The resulting sequence would subsequently be decoded and, finally, the reversing function $h_1^{-1}$ would be applied.

The hash functions MD 5, SHA-1, RIPE-MD 160, for example, which respectively provide a 160 bit long hash value, could be used as hash functions $h_1$, $h_2$. The hash function MDC-2 could be used as alternative, for which the length of the hash value corresponds to twice the block length.

Figure 5:
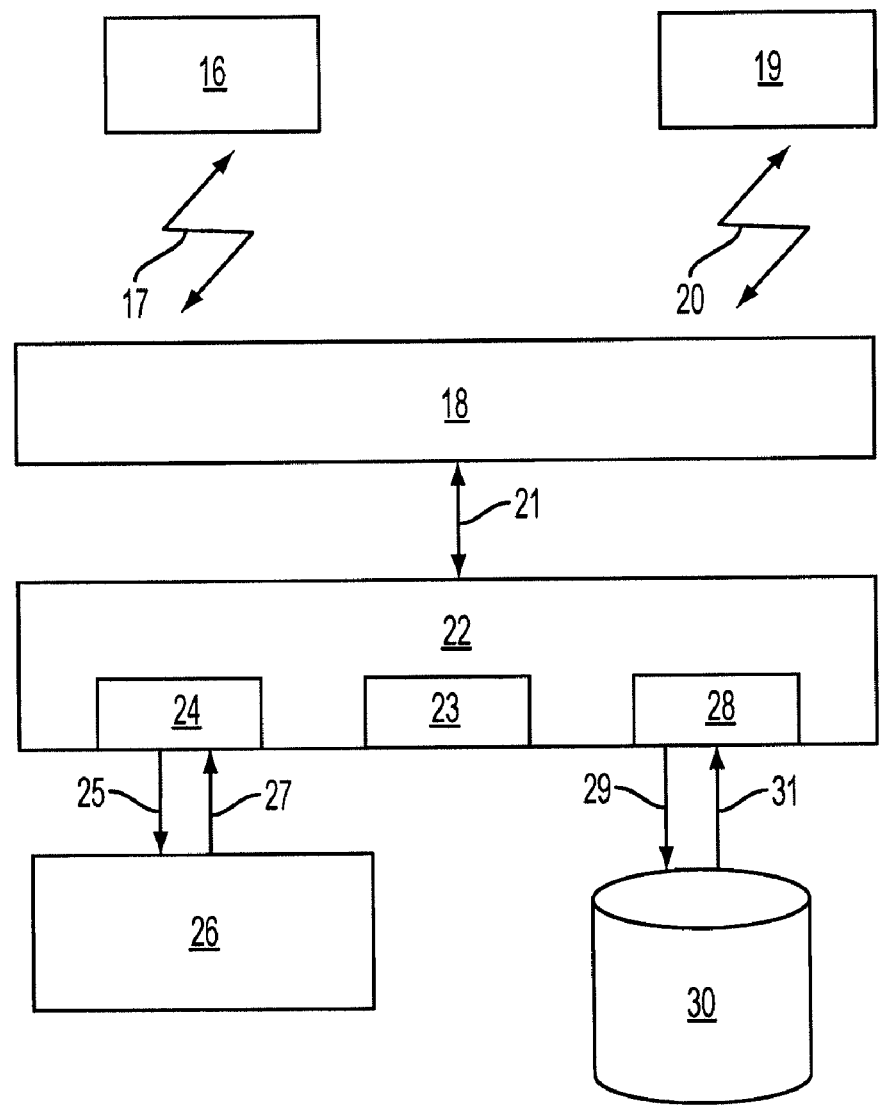
FIG. 5 The implementing of a product protection gateway which is accessible via the Internet.

FIG. 5 shows the implementation of a product protection gateway which is accessible via the Internet. For a product control sequence request, the dealer establishes with the aid of his/her web browser 16 an Internet connection 17 to the web server 18 of the product protection gateway. A protected Internet connection is preferably established, for example an Internet connection protected by the SSL (secure socket layer) protocol, which allows the dealer access to the websites of the product production gateway. The web server 18 is designed so as to allow simultaneous access by several dealers. While an Internet connection 17 to the first dealer exists, a second dealer can establish an Internet connection 20 via his/her web browser 19 to the web server 18. The web server 18 is responsible for processing and transmitting the websites of the product protection gateway, wherein the websites can be designed, for example, according to the HTML (hyper text mark-up language) standard. The web server 18 communicates via an interface 21 with the application server 22 which processes the applications for the dealer requests. Two different computers can be used for the web server 18 and the application server 22, wherein these computers communicate via an internal protocol, for example via SSL. The web server 18 and the application server 22 can also be software modules, which can be installed on one and the same server computer. In that case, the interface 21 between both modules can be realized as joint process interface.

Once a dealer has entered his/her ID and password on the corresponding Internet site, these data are transmitted by the web server 18 via the interface 21 to the application server 22 where they are processed by a process 23 that is responsible for the legitimacy check. A product control sequence input by the dealer also travels via the interface 21 to the application server 22 where a process 24 is implemented, which is responsible for checking the product control sequence. The process 24 transmits the product control sequence 25 to the crypto server 26. The crypto server 26 can be a separate computer, which is separate by a firewall from the application server 22. However, the crypto server 26 can also be installed as cryptography module on the server computer, on which the other software modules are installed as well. The crypto server 26 realizes a decoding of the encoded check sequence contained in the product control sequence 25. Once the crypto server 26 has realized the decoding operation, shown in FIGS. 2 to 4, it compares the decoded check sequence with the non-encoded identification sequence K, which can be a component of the product control sequence 25. For an alternative embodiment of the invention, the crypto server 26 compares the decoded check sequence to a sequence allotted to the respective dealer. An authentic product control sequence exists if a match is detected.

The result 27 of the authenticity check is transmitted back to the process 24. A second test is furthermore used for each product control sequence entered by the dealer to determine whether a request for this product control sequence was submitted at an earlier date. To realize this check, a process 28 is run on the application server 22 for querying the database. The process 28 transmits a request 29 to a login database 30. The login database contains data sets for previously processed requests and is preferably implemented as relational database, which can be queried with the aid of the query language SQL (structured request language). The request 29 contains the product control sequence, the identification sequence, the encoded check sequence, the decoded check sequence, or several of these sequences. The login database 30 is then checked to determine whether or not earlier requests for these sequences were submitted. The result 31 is then transmitted by the login database 30 to the process 29, wherein multiple prior requests indicate a suspicion of product imitation. However, if no prior requests for this product control sequence were found in the login database 30 and the requested product control sequence was identified as being authentic by the crypto server 26, the product with high reliability is an original product.

For each request relating to a valid product control sequence, a new entry is made in the login database 30, comprising either the product control sequence, or the identification sequence, or the encoded check sequence, or the decoded check sequence (or several such sequences). The database entry can additionally also contain the ID of the requesting dealer and possibly the date and time when the request was submitted. Future requests for product control sequences, for which an earlier request was submitted, can then be identified with the aid of the database entry.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A computer implemented method for protecting a product identification to ensure the authenticity of a product piece, comprising the following steps:
    creating product protection identification comprising:
        detecting on a first computer a product-specific identification sequence (K) for each product piece;
        converting on said first computer the product-specific identification sequence (K) with a first hash method to a first hash sequence;
        generating on said first an encoded check sequence (C) by encoding the first hash sequence by using a symmetric encoding method (F1) and a secret encoding sequence (B);
        converting on said first computer the encoded check sequence (C) with a second hash method to a second hash sequence;
    affixing to or on the product piece a product control sequence, comprising:
        (a) the encoded check sequence (C) or a sequence that is derived from the encoded check sequence (C), and
        (b) the second hash sequence;
    checking the product protection identification affixed on or to the product piece comprising:
        receiving the product control sequence via a second computer;
        deriving a decoded sequence on said second computer by decoding the product control sequence;
        checking the authenticity on said second computer of the decoded product control sequence.

2. The computer implemented method as defined in claim 1, wherein the encoded check sequence (C) cannot be generated from the product-specific identification sequence (K) without knowledge of the secret encoding sequence (B).

3. The computer implemented method as defined in claim 1, wherein the product control sequence comprises the product-specific identification sequence (K) in addition to the encoded check sequence (C) or the sequence derived from the encoded check sequence (C).

4. The computer implemented method as defined in claim 1, wherein a serial number of the product piece is used as product-specific identification sequence (K).

5. The computer implemented method as defined in claim 1, wherein one of the following encoding methods Triple-DES, IDEA, CAST-128, Blowfish, RC5, f8, Rijndael is used for the symmetric encoding method.

6. The computer implemented method as defined in claim 1, wherein at least one of the first hash method or the second hash method is selected from among of the following hash methods: MD 5, SHA-1, RIPE-MD 160, MDC-2.

7. The product piece as defined in claim 1, wherein the product control sequence is affixed to the product piece in the form of an alphanumeric character string.

8. The product piece as defined in claim 1 wherein the product control sequence is affixed to the product piece in a machine-readable form.

9. The product piece as defined in claim 1, wherein the product control sequence is affixed to the product piece as visually readable text.

10. The product piece as defined in claim 1, wherein the product control sequence is affixed to a document enclosed with the product piece or is affixed to the packaging.

11. A computer implemented method for checking the authenticity of a product piece with a product control sequence affixed on or to the product piece, and using the Internet, comprising:
  detecting the product control sequence on the side of a person submitting the authenticity check, wherein the product control sequence was generated and affixed on or to the product piece by steps including: detecting a product-specific identification sequence (K) for the product piece: generating on a computer, an encoded check sequence (C) using a symmetric encoding method (F1) with a seret encoding sequence (B), wherein the symmetric encoding method is performed on one of: the product-specific identification sequence (K) or a sequence dervied from (K); converting on the computer, the encoded check sequence (C) with a hash method to a hash sequence; fixing to or on the product piece product control sequence, which comprises (a) the encoded check sequence (C) or a sequence that is derived from the encoded check seqence (C) and (b) the hash sequence;
  transmitting of the product control sequence via the Internet to a product-protection server structure;
    converting on the product-protection server structure, the hash sequence with a hash reversing function to derive the encoded check sequence (C);
  decoding on the product-protection server structure the encoded check sequence (C) that is derived from the product control sequence, by using a decoding method (F2) and a decoding sequence (A) and generating on said product-protection server a decoded check sequence, wherein the decoding sequence (A) and the secret encoding sequence (B) together form a complementary code pair;
  checking on the product-protection server structure, the authenticity of the decoded check sequence or a sequence derived from the decoded check sequence; and
  transmitting of the result of the authenticity check via the Internet to the person requesting the check.

12. The computer implemented method as defined in claim 11, wherein the decoding sequence (A) is the secret code for a symmetric encoding method.

13. The computer implemented method as defined in claim 11, wherein decoding sequence (A) is the public code for an asymmetric encoding method.

14. The computer implemented method as defined in claim 11, wherein the product control sequence comprises the encoded check sequence (C) in the form of a sequence segment or that the check sequence is derived from a sequence segment of the product control sequence by using a hash reversing function.

15. The computer implemented method as defined in claim 11, wherein the decoded check sequence represents a product-specific identification sequence (K) or is converted to a product-specific identification sequence (K) by using a hash reversing function.

16. The computer implemented method as defined in claim 11 wherein the authenticity of the decoded check sequence or a sequence derived from the decoded check sequence is checked by comparing the decoded check sequence or the sequence derived from the decoded check sequence to a product-specific identification sequence (K), which forms a sequence segment of a product control sequence, or a sequence derived from the product-specific identification sequence (K).

17. The computer implemented method as defined in claim 11, wherein the authenticity of the decoded check sequence or a sequence derived from the decoded check sequence is checked by checking whether the decoded check sequence or the sequence derived thereof matches predetermined sequence allotments.

18. The computer implemented method as defined in claim 11, wherein the product-specific identification sequence (K) is the serial number for the product piece.

19. The computer implemented method as defined in claim 11, wherein the legitimacy of the party submitting the control request is checked within the framework of checking a product control sequence.

20. The computer implemented method as defined in claim 11, wherein a database entry is made to a login database within the framework of a control request for a product control sequence.

21. The computer implemented method as defined in claim 20, wherein at least one of the following: the product control sequence, the product-specific identification sequence (K), the encoded check sequence (C) or the decoded check sequence or a sequence derived from the decoded check sequence, is compared to entries in the login database, wherein the product piece is identified as either an imitation or a model for an imitation if at least one match is found.

22. The computer implemented method as defined in claim 20, wherein a database entry for a control request includes the date for the control request.

23. The computer implemented method as defined in claim 20, wherein a database entry comprises the identity of the individual submitting the control request.

24. The cornputer implemented method as defined in claim 11, wherein a database request is implemented in a login database to detect earlier control requests for the product control sequence of the product piece.

25. A computer implemented method for preventing the imitation of a product comprising:
  generating a product protection identification which is affixed on or to the product piece comprising:
    detecting on a first computer, a product-specific identification sequence (K) for each product piece;
    generating on, said first computer, an encoded check sequence (C) using a symmetric encoding method (F1), with a secret encoding sequence (B), wherein said symmetric encoding method is performed on one of:
      the product-specific identification sequence (K) or a sequence derived from (K);
    converting on said first computer, the encoded check sequence (C) with a hash method to a hash sequence;
    affixing to or on the product piece a product control sequence, comprising:
      (a) the encoded check sequence (C) or a sequence that is derived from the encoded check sequence (C) and
      (b) the hash sequence; and
  checking the product protection identification affixed on or to the product piece using the internet, comprising:
    detecting the product control sequence by a submitter of a control request;
    transmitting of the product control sequence via the Internet to a product-protection server structure;
    converting on the product-protection server structure, the hash sequence with a hash reversing function to derive the encoded check sequence (C);
    decoding on the the product-protection server structure, the encoded check sequence (C) that is derived from the product control sequence, on the side of the product-protection server structure, by using a decoding method (F2) and a decoding sequence (A) and generating a decoded check sequence, wherein the decoding sequence (A) and the encoding sequence (B) together form a complementary code pair;

checking on the product-protection server structure, the authenticity of the decoded check sequence or a sequence derived from the decoded check sequence; and transmitting the result of the authenticity check via the Internet to the submitter of the control request.

26. The computer implemented method as defined in claim 25, wherein the encoded check sequence (C) cannot be generated from the product-specific identification sequence (K) without knowledge of the secret encoding sequence (B).

27. The computer implemented method as defined in claim 25, wherein the product control sequence comprises the product-specific identification sequence (K) in addition to the encoded check sequence (C) or the sequence derived from the encoded check sequence (C).

28. The computer implemented method as defined in claim 25, wherein a serial number of the product piece is used as product-specific identification sequence (K).

29. The computer implemented method as defined in claim 25, wherein the secret encoding sequence (B) is the secret code for a symmetric encoding method.

30. The computer implemented method as defined in claim 29, wherein one of the following encoding methods Triple-DES, IDEA, CAST-128, Blowfish, RC5, f8, Rijndael is used for the symmetric encoding method.

31. The computer implemented method as defined in claim 25, wherein the secret encoding sequence (B) is the secret code for an asymmetric encoding method.

32. The computer implemented method as defined in claim 31, wherein the asymmetric encoding method is selected from among the following encoding methods: RSA, ElGamal, DSA, ECC.

33. The computer implemented method as defined in claim 25, wherein if a sequence is derived from (K), the sequence derived from (K) is a hash sequence derived with the aid of a hash method, wherein the encoded check sequence (C) is generated by encoding the hash sequence derived from (K) with the secret encoding sequence (B).

34. The computer implemented method as defined in claim 25, wherein at least one of the hash method for deriving the hash sequence from (K) or the hash method for converting the encoded check sequence (C) is selected from among of the following hash methods: MD 5, SHA-1, RIPE-MD 160, MDC-2.

35. The computer implemented method as defined in claim 25, wherein the decoding sequence (A) is the secret code for a symmetric encoding method.

36. The computer implemented method as defined in claim 25, wherein the decoding sequence (A) is the public code for an asymmetric encoding method.

37. The computer implemented method as defined in claim 25, wherein the product control sequence comprises the encoded check sequence (C) in the form of a sequence segment or that the check sequence is derived from a sequence segment of the product control sequence by using a hash reversing function.

38. The computer implemented method as defined in claim 25, wherein the decoded check sequence represents a product-specific identification sequence (K) or is converted to a product-specific identification sequence (K) by using a hash reversing function.

39. The computer implemented method as defined in claim 25, wherein the authenticity of the decoded check sequence or a sequence derived from the decoded check sequence is checked by comparing the decoded check sequence or the sequence derived from the decoded check sequence to a product-specific identification sequence (K), which forms a sequence segment of a product control sequence, or a sequence derived from the product-specific identification sequence (K).

40. The computer implemented method as defined in claim 25, wherein the authenticity of the decoded check sequence or a sequence derived from the decoded check sequence is checked by checking whether the decoded check sequence or the sequence derived thereof matches predetermined sequence allotments.

41. The computer implemented method as defined in claim 25, wherein the product-specific identification sequence (K) is a serial number for the product piece.

42. The computer implemented method as defined in claim 25, wherein the legitimacy of the party submitting the control request is checked within the framework of checking a product control sequence.

43. The computer implemented method as defined in claim 25, wherein a database entry is made to a login database within the framework of a control request for a product control sequence.

44. The computer implemented method as defined in claim 43, wherein at least one of the following: the product control sequence, the product-specific identification sequence (K), the encoded check sequence (C) or the decoded check sequence or a sequence derived from the decoded check sequence, is compared to entries in the login database, wherein the product piece is identified as either an imitation or a model for an imitation if at least one match is found.

45. The computer implemented method as defined in claim 43, wherein a database entry for a control request includes the date for the control request.

46. The computer implemented method as defined in claim 43, wherein a database entry comprises the identity of the individual submitting the control request.

47. The computer implemented method as defined in claim 25, wherein a database request is implemented in a login database to detect earlier control requests for the product control sequence of the product piece.

* * * * *